June 25, 1929.                T. ROSS                1,718,382
                        SEGMENT TRIMMING DEVICE
                         Filed Sept. 17, 1928
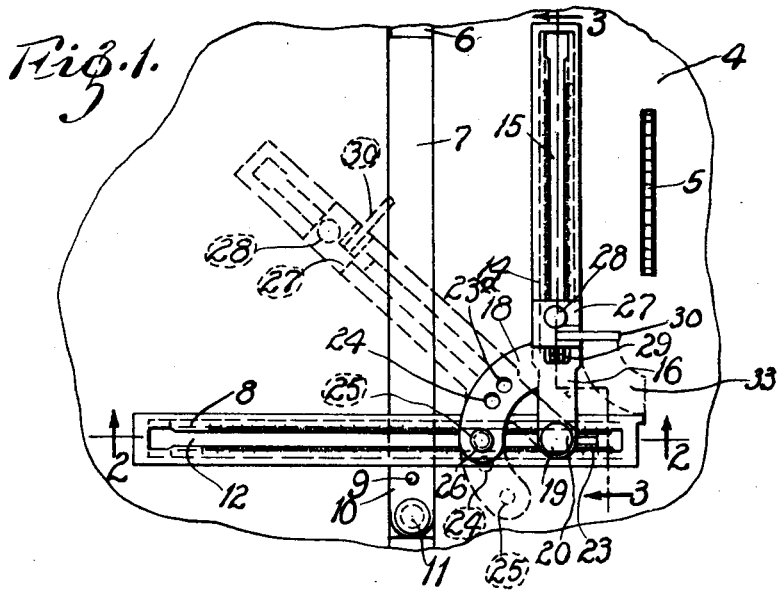
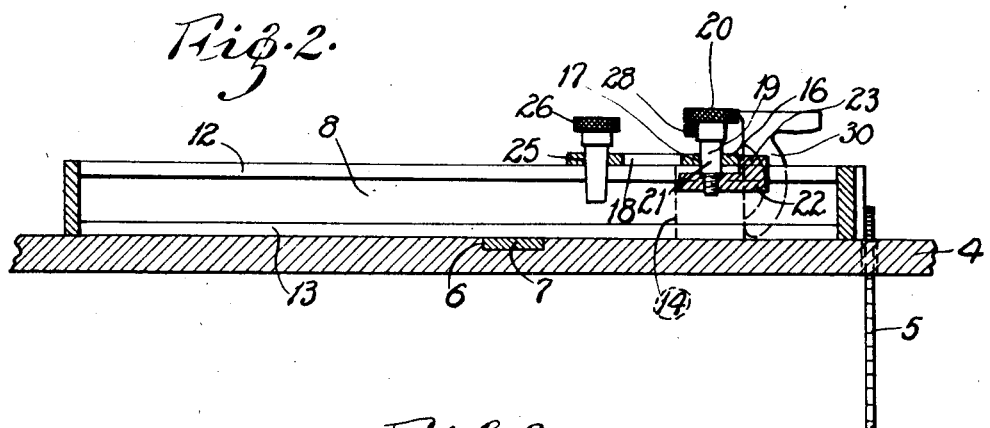
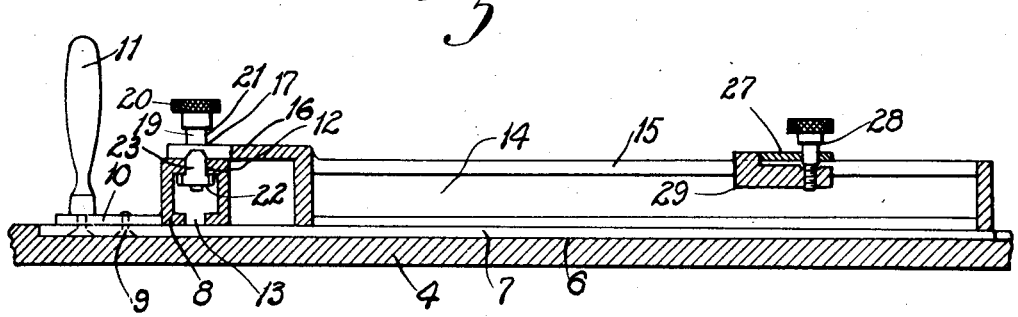
INVENTOR:
THOMAS ROSS.
BY Arthur C Eckert
ATTORNEY.

Patented June 25, 1929.

1,718,382

UNITED STATES PATENT OFFICE.

THOMAS ROSS, OF ST. LOUIS, MISSOURI.

SEGMENT-TRIMMING DEVICE.

Application filed September 17, 1928. Serial No. 306,451.

The object of my device is to trim or cut the rough stock from circular segments, such as are principally used in making wood patterns for cylindrical or annular objects. My device is used principally by pattern makers, but may be used by cabinet makers and carpenters. It may be used for sheet metal as well as wood, but I have specifically described the device that is used by pattern makers in making patterns from wood.

In making a wooden pattern for a hollow cylinder, for instance, the method consists in placing a circular course on top of another course as in brick work. Each course is made of segments, which are glued together to make the circular courses. The circular courses are glued together to make the hollow cylindrical structure. A varying number of segments is used to make the sections for different classes and sizes of work. The prevailing practice is to use 4, 6, 8, 10, 11 and 12 segments to make a circle for a course. Obviously the ends of the segments must be cut at the proper angle in order to complete a perfect circular section. Likewise this angle of the end cut of the segments varies with the number of segments that are used to build up the section.

In practice the segments are cut in their arcuated shape in a conventional band saw, the segmental ends are then cut or trimmed. My device is used for this cutting or trimming operation.

A circular saw is used to cut or trim these segmental ends. My device is an attachment that is placed on the table of a circular saw, wood trimmer, or disc sander. It is so made that it may be quickly and easily operatively positioned on the saw table top. The device is made of few and simple parts that lend themselves readily to multiple production and may be easily and simply attached and adjusted to and on the table. By the use of my device the element of chance or approximation is taken away in cutting the segmental ends and replaced with absolute accuracy. By the use of my device the time required for the cutting operation is greatly reduced.

With these and other objects in view my invention has relation to certain novel features of construction and arrangement of parts as will be hereinafter more fully described, pointed out in the claims and illustrated in the drawing in which Fig. 1 is a fragmental plan view of the table top of circular saw together with the protruding portion of the saw, with my device attached in operative position.

Fig. 2 is a longitudinal sectional elevation on the line 2—2 of Fig. 1.

Fig. 3 is a sectional elevation on the line 3—3 of Fig. 1 with the stop in another position.

Numeral 4 designates a portion of the table top of the circular saw table. Numeral 5 designates the circular saw; numeral 6 a conventional rectangular slot in the table top. The slot 6 is parallel to the plane of the circular saw 5. Numeral 7 designates a slide, which is in sliding engagement in the slot 6 and of such thickness as to be on the same plane as the plane of the surface of the table top. To the slide 7, at right angles, is secured the slotted guide 8 by means of the screws 9. Numeral 10 designates a finger formed integral with the slotted guide 8 and centrally located and at right angles thereto. The screws 9 pass through the slide 7 and into the finger 10. By these means a T square is formed between the slide 7 and the slotted guide 8. Numeral 11 designates a handle secured to the upper surface of the finger 10 centrally to permit the facile sliding of the slide 7 together with the slotted guide 8 in the slot 6. The ends of the slotted guide 8 are rectangular in shape and approximately squares. The sides of the slotted guide 8 are also rectangular in shape. The slotted guide 8 is hollow and has the slot 12 formed in its upper face. Its bottom may be similarly slotted by the slot 13. The top face of the slotted guide 8 is graduated on each side of the slot 12 longitudinally, the graduations beginning near the right end of the slot 12 and proceeding numerically upward to the left. These graduations are distance graduations from the end of said slide corresponding to the radial dimensions of cylinders formed by segments of two different angles determined by two different positions of the angularly adjustable guide. The graduations on one side of the slot 12 are different from those on the other side of said slot, as for reasons hereinafter explained. Numeral 14 designates a second slotted guide which in shape and structure is approximately that of the slotted guide 8. This second slotted guide 14 is likewise approximately square at the ends, its sides are rectangular and it is hollow and of the same height as the slotted guide 8. Numeral 15 designates a slot in the upper surface of the second slotted guide 14. This slot is rectangular in shape and is graduated on both sides just as the two sides of the slot 12 of the slotted guide 8 are graduated. One end of the second slotted guide 14 is secured to the arm 16, having the hole 17 formed therein centrally. To the arm 16, at its inner end is secured the arcuated finger 18. Numeral 19 designates a bolt having the head 20 and the shaft 21, which shaft 21 is positioned through the hole 17 and projects into the slot 12 of the slotted guide 8. Numeral 22 designates a plate having a tapped hole therein. The end of the shaft 21 is placed in threaded engagement in the tapped hole in the plate 22. To the plate 22 is secured the finger 23 which projects slightly upward through the slot 12 of the slotted guide 8, and has a reading line formed thereon at right angles to the slot 12 of the slotted guide 8.

By these means the second slotted guide 14 is pivotally secured to the slotted guide 8. By tightening the bolt 19 the relative angularity of the slotted guide 8 and of the second slotted guide 14 may be maintained. In the arcuated arm 18 are formed the holes 23$^a$, 24 and 25. Numeral 26 designates a pin of such size as to permit its being placed in either of the holes 23$^a$, 24 or 25 and also to project slightly into the slot 12. By means of this pin and the holes 23$^a$, 24 and 25, the second slotted guide 14 may be selectively secured at three different angles with the slotted guide 8. The position in the hole 23$^a$ is the one to be used in cutting segmental ends at forty-five degrees 24 at sixty degrees and 25 at ninety degrees.

In Fig. 1 this relative position is shown in solid lines to be ninety degrees, in dash line at forty-five degrees.

Numeral 27 designates a plate having a perforation therein permitting the passage of the bolt 28 therethrough. Numeral 29 designates a second plate having a tapped hole therein, the bolt 28 passes through the plate 27 through the slot 15 of the second slotted guide 14 and is secured into the second plate 29. By this means the plate 27 may be slid longitudinally along the top graduated surface of the second slotted guide 14. Numeral 30 designates an arcuated stop which is pivotally secured to standards, extending vertically from the plate 27. The purpose of the arcuated stop 30 is to hold the segment in position when being out, as will be subsequently described. The segment to be cut is indicated in Fig. 1 by means of the dash lines 33. The operation of my device is as follows:

Numeral 33 designates a segment, the ends of which are to be cut or trimmed. Assume that the ends of the segment 33 are to be cut at right angles to each other and that the radius of the circle is 6 inches. Slide the slotted guide 14 along the slotted guide 8 holding the slotted guide 8 by positioning the pin 26 in the hole 25, the pin 26 passing into the slot 12 in the slotted guide 8. Measure 6 inches from the end of the slotted guide 8 to the left. To obtain the exact length of the segment move the arcuated stop 30 six inches from the face of the slotted guide 8. This places the device in the position to cut the ends of segments, four of which will make a circle having a diameter of 12 inches.

If it is desired to cut the ends for six segments to make a circle 12 inches in diameter move the slotted guide 14 along the slotted guide 8 until the reading line of finger 23 is at the numeral 6 on the inside graduated face of the slotted guide 8. Then swing the slotted guide 14 to an angle of sixty degrees with the slotted guide 8, that is, place pin 26 in hole 24, and then tighten bolt 28. The device is now in position. Cut one end of the segment with stop 30 raised, reverse segment, lower stop 30, place trimmed end against stop 30 and finish the cut, 6 segments of this length will form a circle. The cutting is accomplished by the grasping of the handle 11 and sliding the entire device in slot 7 until the segment comes in contact with the saw and then push it forward until the cut is finished.

When the slotted guide 14 is at an angle of sixty degrees, the graduated scale on the inside of the slotted guide 8 and the scale on the inside of the slotted guide 14 are used for segments, six to a circle. When the slotted guide 14 is at an angle of forty-five degrees, the scale on the outside of the slotted guide 8 and the scale on the outside of the slotted guide 14 are used for making eight segments to a circle.

If it is desired to cut the ends for eight segments to make a circle twenty-four inches in diameter, move the slotted guide 14 along the slotted guide 8 until the reading line of the finger 23 is at the numeral 12 on the outside graduated face of the slotted guide 8, then swing the slotted guide 14 to an angle of forty-five degrees with the slotted guide 8, that is, place the pin 26 in the hole 23$^a$ and then tighten the bolt 28. The device is now in position. Cut one end of the segment with the stop 30 raised, reverse the segment, lower stop 30, place the trimmed end against stop 30 and finish the cut, eight segments of this length will form a circle.

What I claim and mean to secure by Letters Patent is:

1. In combination with a saw table top, a slide in sliding engagement in a slot on said saw table top, a slotted guide secured to said slide at right angles thereto, a second slotted guide pivotally secured to said slotted guide, the pivot of said second slotted guide being in sliding engagement in the slot of the first slotted guide, and a stop in sliding engagement in the slot of said second slotted guide.

2. In combination with a table top having a slot, a slide in sliding engagement in said slot, a slotted guide secured in said slide, said slotted guide having one face dually graduated, one set of graduations being positioned on each side of the slot, the graduations on said slotted guide being distance graduations from the end of said slide corresponding to the radial dimensions of cylinders formed by segments of two different angles determined by two different positions of the angularly adjustable guide, a second slotted guide pivotally secured in the slot of said slotted guide, the pivotal point being adjustable in the slot longitudinally thereof, a stop slidably secured in the slot of said second slotted guide, and means of selectively securing said second slotted guide at a predetermined angle relative to said slotted guide.

3. In combination with a table top having a slot, a slide in sliding engagement in said slot, a slotted guide secured to said slide, said slotted guide having one face dually graduated, one set of graduations being positioned on each side of the slot, the graduations on said slotted guide being distance graduations from the end of said slide corresponding to the radial dimensions of cylinders formed by segments of two different angles determined by two different positions of the angularly adjustable guide, a second slotted guide pivotally secured in the slot of said slotted guide and means of selectively securing said second slotted guide at a predetermined angle relative to said slotted guide, an arcuated stop secured in sliding engagement in the slot of said second slotted guide, and pivoted to swing transversely across the guide into and out of operative position.

In testimony whereof I affix my signature.

THOMAS ROSS.